UNITED STATES PATENT OFFICE.

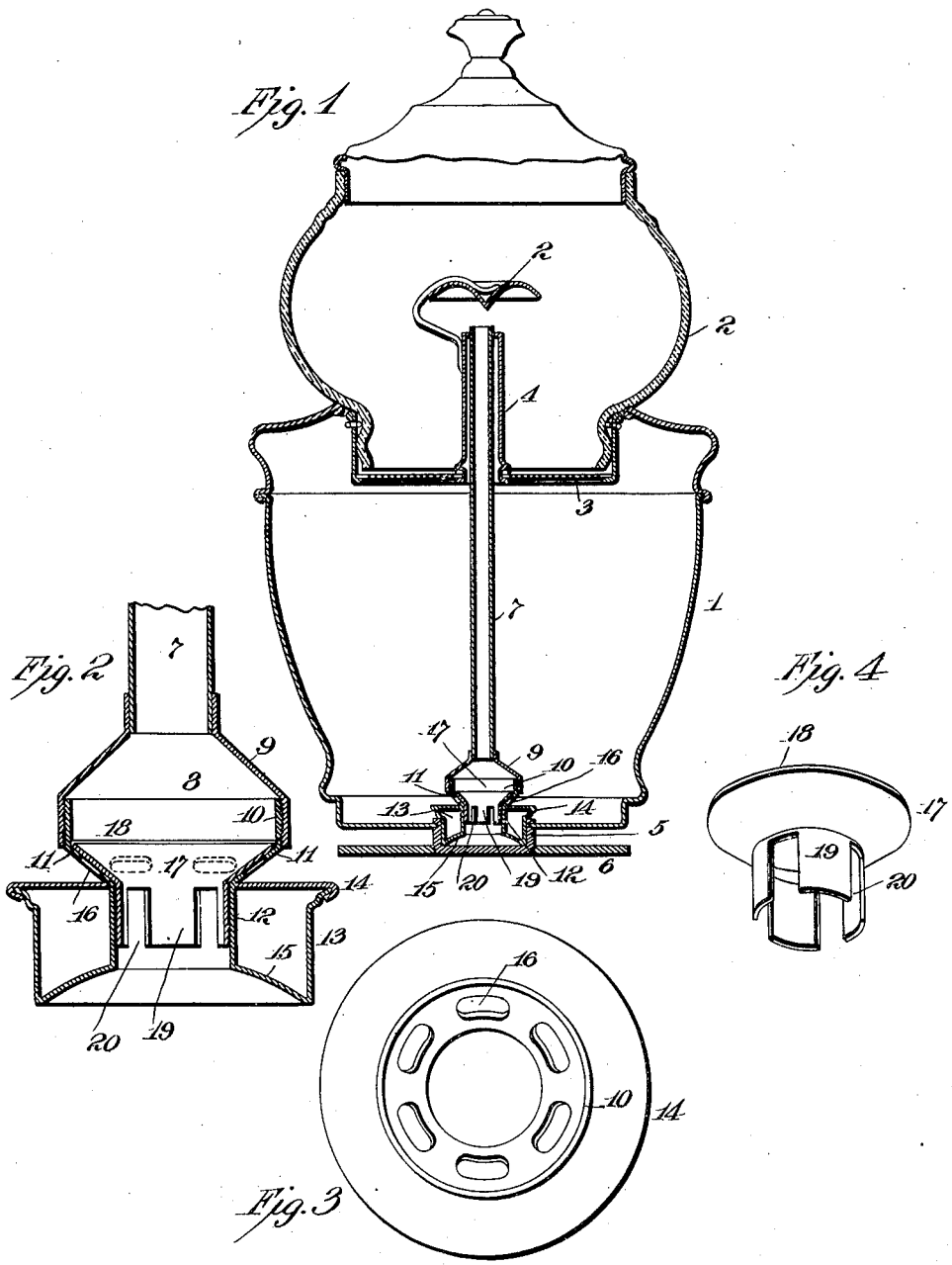

CHARLES NELSON, OF BROOKLYN, NEW YORK, ASSIGNOR TO S. STERNAU & CO., OF NEW YORK, N. Y., A COPARTNERSHIP.

COFFEE-MACHINE.

938,605.   Specification of Letters Patent.   Patented Nov. 2, 1909.

Application filed May 3, 1907. Serial No. 371,582.

*To all whom it may concern:*

Be it known that I, CHARLES NELSON, a subject of the King of Sweden, residing in the borough of Brooklyn, county of Kings, and State of New York, have invented an Improvement in Coffee-Machines, (Case E,) of which the following is a specification.

The object I have in view is the production of a machine for making coffee or an infusion from coffee, tea or other materials for the production of a beverage or for other analogous or different purposes, which machine will have advantages over others heretofore produced.

The particular advantages I seek to secure are to produce a machine which will initiate a percolating action in a very short time after heat has been applied, and before the water in the receptacle has been raised appreciably in temperature.

Other objects lie in the production of a device which may be readily cleaned, and which will be cheap to manufacture.

I obtain these objects by the mechanism illustrated in the accompanying drawings, in which—

Figure 1 is a longitudinal section of a coffee machine embodying my invention. Fig. 2 is an enlarged sectional view of the lower portion of the percolator. Fig. 3 is a plan view of the lower portion of the percolator with the valve removed, and Fig. 4 is a perspective view of the valve.

In all of the views, like parts are designated by the same reference characters.

In carrying out my invention I provide a receptacle 1 for containing the water or infusion after the latter is made. Above the receptacle is a globe 2 usually made of glass. Between the receptacle and globe is a screen 3 for containing the coffee, tea or other substance of which the infusion is to be made. This screen is provided with a central tube 4 which extends up into the globe 2. The purpose of this tube 4 is to prevent the coffee or other substance in the screen from coming in contact with any portion of the percolator.

The bottom of the receptacle 1 is provided with a recess 5, which is centrally disposed and is preferably circular in plan. At the bottom of the recess 5 is a plate 6, which is adapted to extend over sufficient area to prevent the heat of the flame from the lamp or other source of heat from coming in direct contact with the bottom of the receptacle. This plate also serves to convect the heat to the recess 5. The upper portion of the recess 5 communicates with the interior of the receptacle 1.

The percolator is adapted to rest within the recess 5, and to extend upward through the central tube 4. As illustrated the percolator comprises a vertical tube 7, open at the upper end and connected at its lower end with the upper portion of a valve chamber 8. This valve chamber is preferably made in two parts, the cover 9 being permanently secured to the lower end of the tube 7, and screwed or otherwise temporarily secured to the body 10. The body 10 is provided with inclined sides 11, below which is a reduced portion 12 with vertical sides. Above the inclined sides 11 is an enlarged portion with vertical sides. The enlarged portion is provided with screw threads which engage with similar threads on the cover 9 and serve as a means for securing the two parts together. By separating the two parts the inside of the valve chamber may be reached for the purpose of cleansing it.

The valve chamber is connected to an air chamber 13, which is provided with vertical sides of such a size as to snugly fit within the recess 5. An overhanging flange 14 on the edge of the air chamber improves the tightness of the joint between the chamber and the recess. The bottom 15 of the air chamber is dished as shown, so that when it rests upon the bottom of the recess 5 a cavity will be formed between the two. The reduced portion 12 of the valve chamber extends through the center of the air chamber, and is open at the bottom so that communication is attained between the cavity below the bottom of the air chamber and the vertical tube 7.

The inclined sides 11 of the valve chamber are provided with a perforation or perforations 16. These perforations are best made of a shape shown in Fig. 3. A valve 17 lies within the valve chamber and is adapted to close the perforations 16. The valve 17 is provided with a dished body 18, and a hollow stem 19. The hollow stem 19 is provided with a slot or slots 20, which best extend throughout the length of the stem. These slots serve as a means of communication between the inside of the receptacle 1 and the valve chamber, when the valve is lifted from its seat.

The stem of the valve is adapted to engage with the reduced portion 12 of the valve chamber and the length of the stem is such that the valve will be guided when raised from its seat. The periphery of the dished body portion of the valve is adapted to engage with the vertical sides of the valve body so that the valve will be guided at this point. By making the valve of the shape described it is impossible for it to fail to seat itself, under all circumstances. The usual deflector 21 is attached to the central tube 4, and lies in a position above the upper open end of the vertical tube 7.

The operation of the invention is as follows: Ground coffee or other substance of which the infusion is to be made is placed within the screen 3, and water is introduced within the receptacle 1. This water will enter the inside of the valve body through the perforations 16, pressure of the water raising the valve to permit this to be done, the passage being through the slots 20 in the stem. The water will fill the cavity below the bottom of the air chamber and will rise up in the vertical tube 7 to the height of the water within the receptacle 1 or slightly higher owing to capillary action. Heat is now applied to the bottom of the receptacle 1 and plate 6. When the water within the cavity below the air chamber begins to boil the pressure of the steam will force the water up through the stem 7 causing it to strike against the deflector and be spattered over the contents of the screen, whereupon it will seep through the contents back into the receptacle forming the infusion. As soon as the pressure is relieved by the discharge of the liquid through the tube 7 the equilibrium will be established by the introduction of fresh liquid from the inside of the receptacle into the valve chamber, the valve rising for this purpose and opening the perforations 16. The operation will be repeated, the valve intermittently opening and closing. This will continue until an infusion of the desired strength has been produced.

The air chamber 13 is important as it isolates the heat and prevents the contents of the receptacle 1 being raised in temperature. By making the bottom of the chamber dished as shown, a cavity of the smallest size practicable is produced, and one of such a shape that steam is readily generated is secured.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now particularly described the nature of my invention, and in what manner the same is to be performed, what I claim and desire to secure by Letters Patent is:

1. A coffee machine, having a receptacle, a small heating chamber in communication therewith, and a percolator, said percolator having a tube and a valve chamber, said valve chamber communicating directly with the heating chamber and having inclined sides with openings and a reduced portion, the said inclined sides being perforated, in combination with a valve having a dished body and a hollow slotted stem, the body engaging with the inclined sides and the stem lying within the reduced portion.

2. A coffee machine, having a receptacle, a heating chamber communicating therewith, and a percolator, the said percolator having a tube and a valve chamber, said valve chamber having a cover permanently connected to the tube, and a body with inclined sides with openings and a reduced portion, said body being removably connected to the cover, and a valve, said valve having a dished body and a hollow slotted stem, said body engaging with the inclined sides and the stem lying within the reduced portion.

3. A fountain for a coffee machine having an outlet tube communicating with a casing, a cover for the casing, the said casing carrying an insulating chamber at its lower end and having a flaring portion at its upper end, the casing above the flaring portion being removably secured to the cover, the said flaring portion having ports and a valve adapted to close the ports, the said valve having a slotted hollow stem in engagement with the casing.

4. A fountain for a coffee machine having an oulet tube communicating with a casing, a cover for the casing, the said casing carrying an air chamber at its lower end and having a flaring portion at its upper end, the casing above the flaring portion being removably secured to the cover, the said flaring portion having ports and a valve adapted to close the ports, the said valve having a slotted hollow stem in engagement with the casing.

This specification signed and witnessed this 26th day of April, 1907.

CHARLES NELSON.

Witnesses:
LEONARD H. DYER,
JOHN S. LOTSCH.